J. P. & J. M. OWNBY.
Shaft-Coupling.
No. 227,292.                    Patented May 4, 1880.
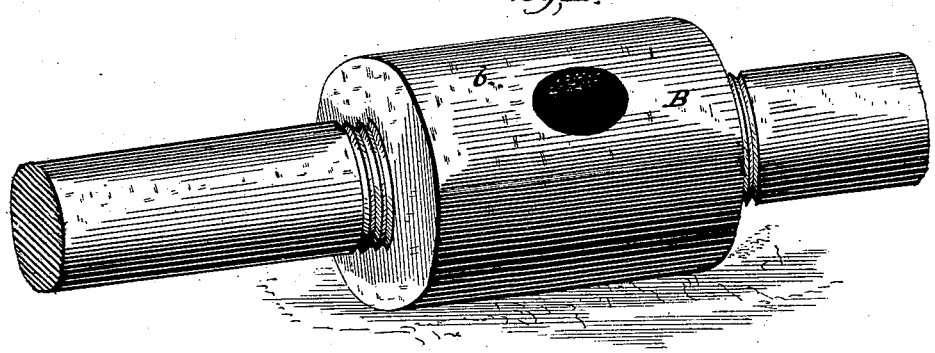
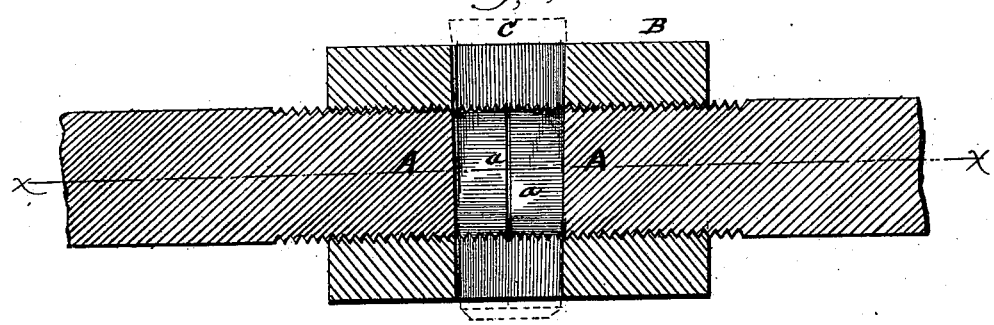
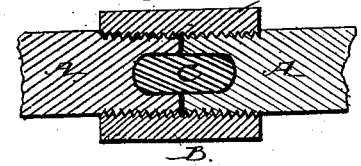
Attest:
T. Walter Fowler,
W. H. Morsell.
Inventors;
James P. Ownby,
James M. Ownby,
per Attys.
A. H. Evans & Co

UNITED STATES PATENT OFFICE.

JAMES P. OWNBY AND JAMES M. OWNBY, OF UNION CITY, TENNESSEE.

SHAFT-COUPLING.

SPECIFICATION forming part of Letters Patent No. 227,292, dated May 4, 1880.

Application filed October 9, 1879.

*To all whom it may concern:*

Be it known that we, JAMES P. OWNBY and JAMES M. OWNBY, of Union City, county of Obion, and State of Tennessee, have invented certain new and useful Improvements in Shaft-Couplings; and we hereby declare the following to be a full, clear, and exact description thereof, reference being had to the accompanying drawings, making part of this specification, and in which—

Figure 1 is a perspective view of a shaft-coupling with our improvements attached. Fig. 2 is a longitudinal section of the same. Fig. 3 is a detail referred to. Fig. 4 is a longitudinal section, reduced in scale, on line $x\,x$ of Fig. 2.

Our invention relates to improvements in couplings for shafts, and our object is to provide a coupling which is perfectly reliable and durable and at the same time very simple in construction; and the improvement consists in threading the meeting ends of the shafting and inserting each, to meet midway, into a sleeve internally threaded to correspond, and in providing the sleeve with a transverse slot and a key to pass through it and through the ends of the shafting to prevent the same from turning in the sleeve.

To enable others skilled in the art to make and use our invention, we will proceed to describe the exact manner in which we have carried it out.

In the drawings, A A represent the meeting ends of the shafting, each provided with screw-threads, and B represents a sleeve, internally threaded to correspond, and provided transversely with a square or oblong slot, $b$, situated at a point equally distant from either end. Each of the ends of the shafting is provided with a slot or depression, $a$, one-half as long as the slot $b$, in order that when the ends are screwed in, meeting in the center of the slot $b$, a tapering key, C, is passed through the slot $b$ and through the ends of the shafting, thus holding them rigidly in place in the sleeve.

In the case of small shafting, where the strain is less, a circular hole and round key may be substituted for the square or oblong slot and key, rendering it easier to fit the coupling.

It is only necessary to withdraw the key and unscrew the sections when they are to be disconnected.

Having thus described our invention, what we claim as new, and desire to secure by Letters Patent, is—

A shaft-coupling consisting of the internally-threaded sleeve B, provided with a transverse slot, $b$, and tapering key C, in combination with sections of shafting having their ends screw-threaded and provided with depressions $a$, substantially as and for the purpose set forth.

JAMES PENINGTON OWNBY.
JAMES MULLOY OWNBY.

Attest:
J. R. MORGAN,
S. T. EVANS.